July 28, 1936.  H. D. SMELSER  2,048,825
ROTARY INTERNAL COMBUSTION ENGINE
Filed May 8, 1935  5 Sheets—Sheet 1
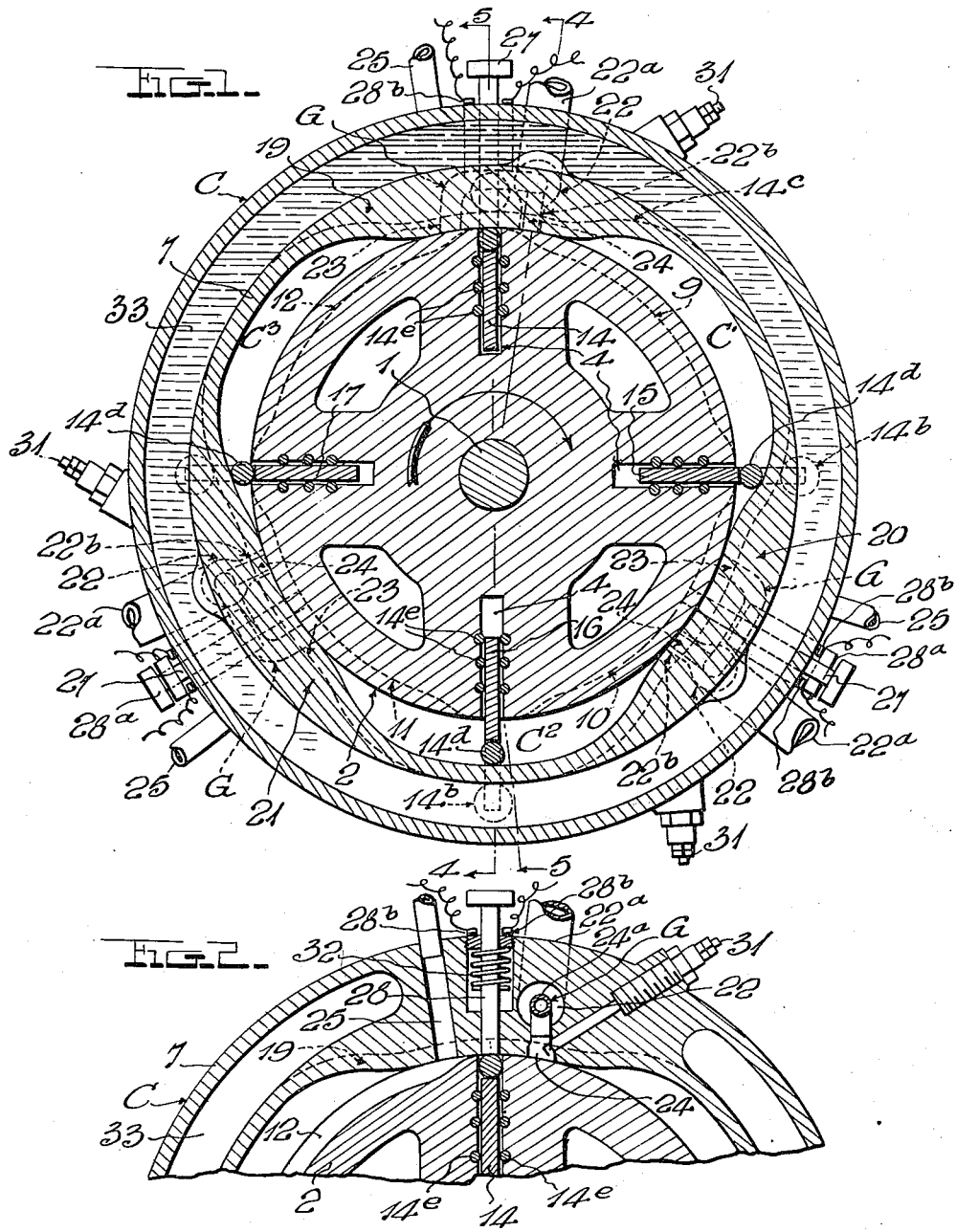
Witness
H. Woodard
Inventor
H. D. SMELSER
By H. D. Wilson &co
Attorneys.

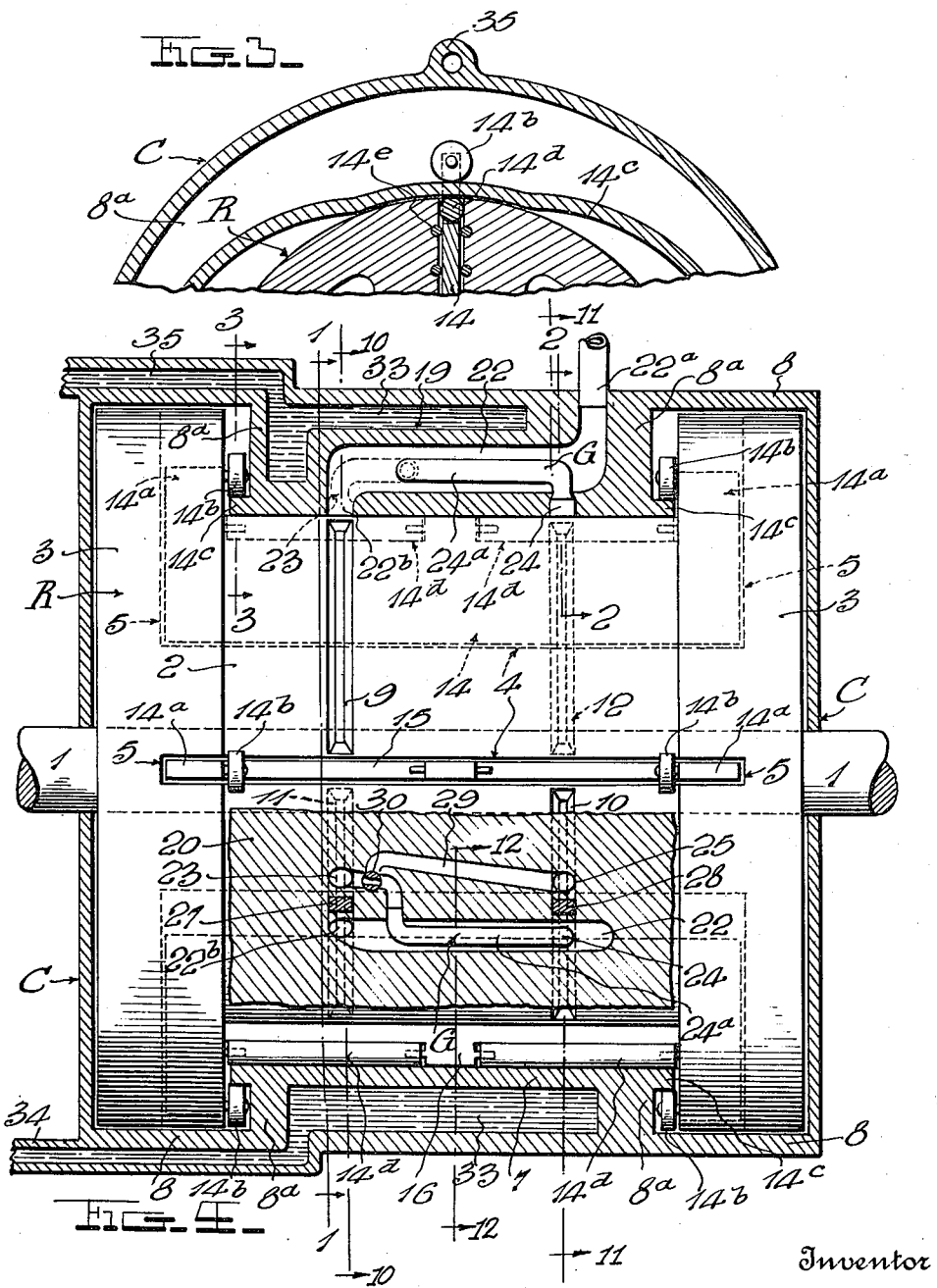

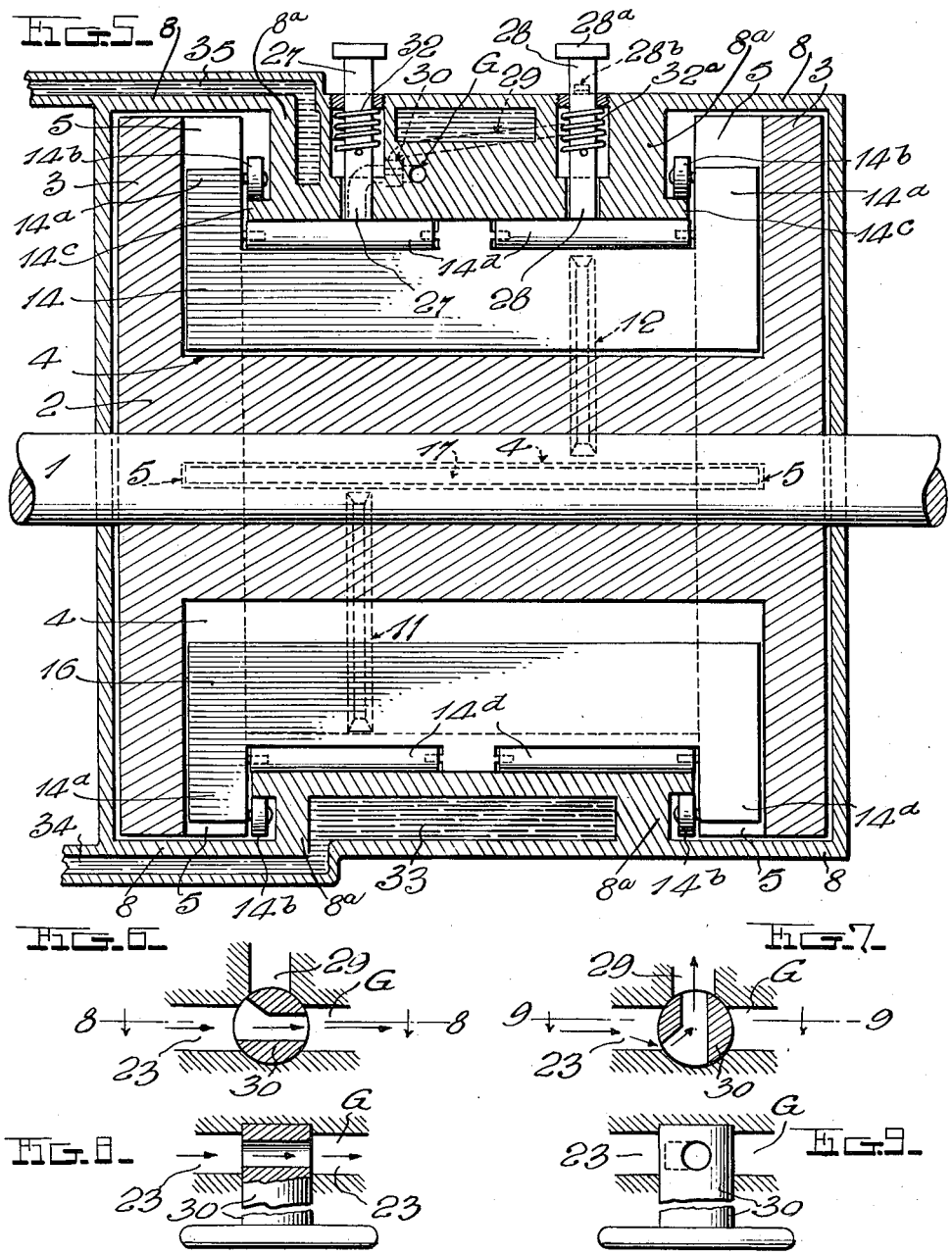

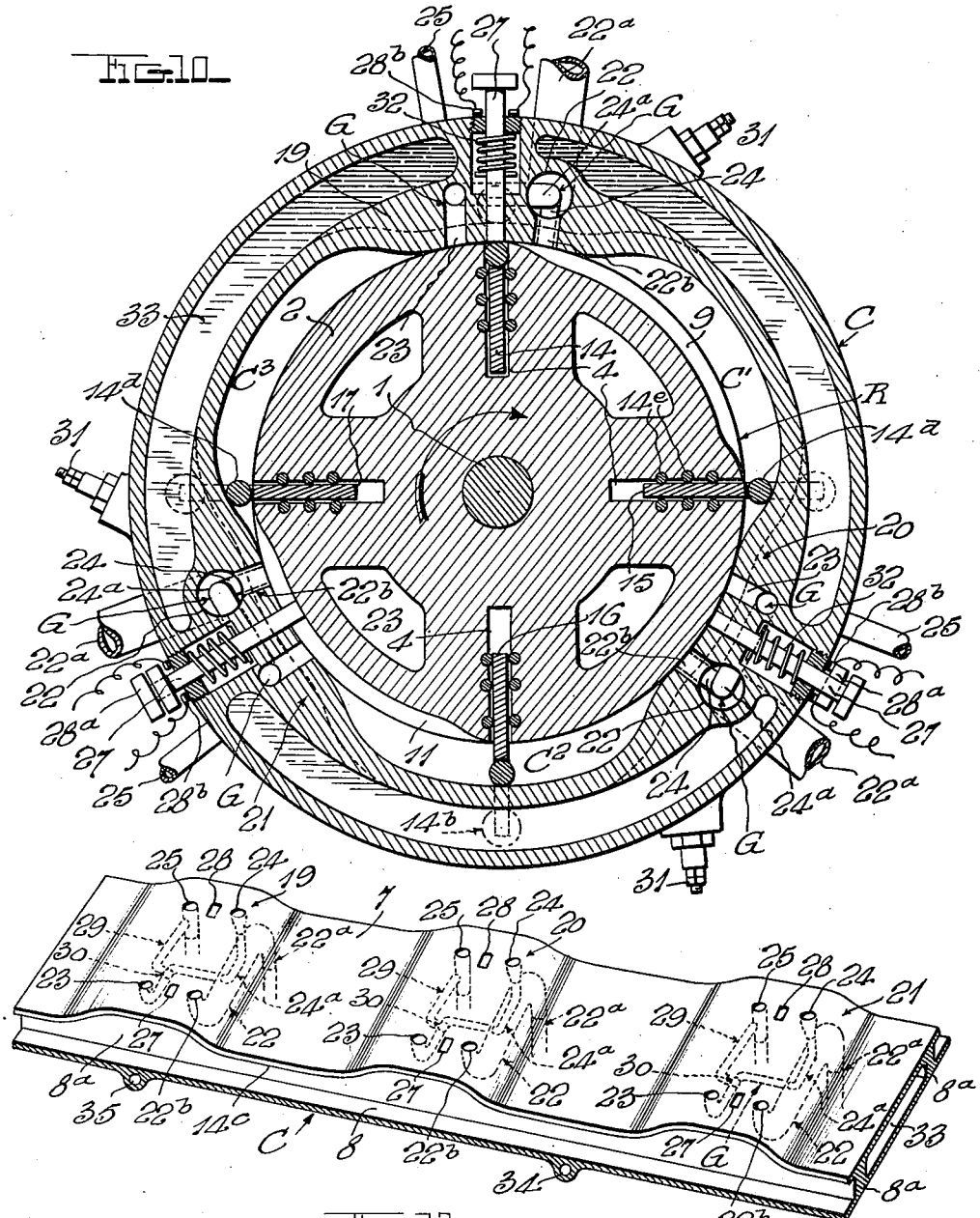

July 28, 1936.  H. D. SMELSER  2,048,825
ROTARY INTERNAL COMBUSTION ENGINE
Filed May 8, 1935    5 Sheets-Sheet 5
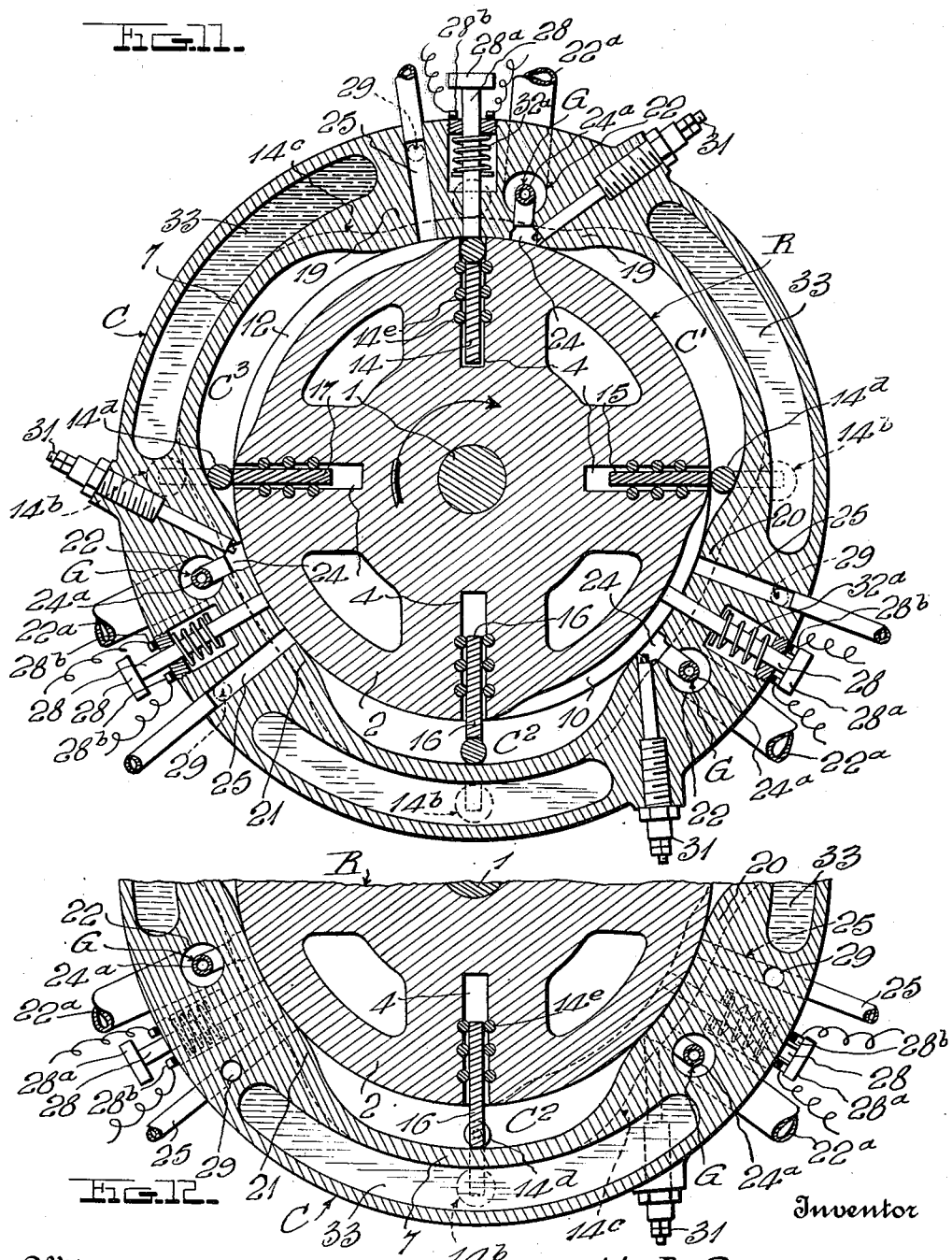
Inventor
H. D. SMELSER Patented July 28, 1936

2,048,825

UNITED STATES PATENT OFFICE 2,048,825

ROTARY INTERNAL COMBUSTION ENGINE

Henry Daniel Smelser, St. Charles, Mo.

Application May 8, 1935, Serial No. 20,485

6 Claims. (Cl. 123—16)

The invention aims primarily to provide a comparatively simple and inexpensive, efficient and durable rotary internal combustion engine which will exert a substantially continual turning force on the rotor.

Further objects are to provide a novel structure constituting a heat exchanger for warming the entering explosive mixture and cooling the combustion chambers; to provide novel means for creating a braking force when desired; and to make novel provisions for radially moving rotor-carried pistons to maintain them in contact with the coacting surface of the enclosing casing.

With the foregoing in view, the invention resides in the novel subject matter hereinafter described and claimed, description being accomplished by reference to the accompanying drawings.

Fig. 1 is a sectional view substantially on line 1—1 of Fig. 4.

Fig. 2 is a fragmentary sectional view on line 2—2 of Fig. 4.

Fig. 3 is a fragmentary sectional view on line 3—3 of Fig. 4.

Fig. 4 is a combined sectional view and elevation. In this view, the engine casing is shown in section on line 4—4 of Fig. 1, the rotor is shown in side elevation, and the abutment 20 is shown in section against said rotor.

Fig. 5 is a sectional view on line 5—5 of Fig. 1.

Fig. 6 is a detail transverse sectional view through one of the brake valves showing its normal position.

Fig. 7 is a view similar to Fig. 6 but showing the brake valve turned to braking position.

Fig. 8 is a partial sectional view on line 8—8 of Fig. 6.

Fig. 9 is a partial sectional view on line 9—9 of Fig. 7.

Figs. 10 and 11 are vertical sectional views on lines 10—10 and 11—11 respectively of Fig. 4.

Fig. 12 is a fragmentary vertical sectional view on line 12—12 of Fig. 4.

Fig. 13 is a developed diagrammatic perspective view of the circumferential casing wall "rolled out into substantially straight form" illustrating the abutments of said wall and the relative positions of the various passages formed in said abutments.

A substantially cylindrical stationary casing C is provided for the rotor R, the shaft 1 of the rotor being, of course, mounted in appropriate bearings. The rotor R is provided with a cylindrical body portion 2 and with thick end flanges 3 of continuous form projecting beyond the periphery of said body portion. This body portion 2 is formed with circumferentially spaced pockets 4 which open through its periphery, and the inner sides of the flanges 3 are formed with radial grooves 5 which communicate with the ends of said pockets. The circumferential wall of the casing is provided with a substantially cylindrical body portion 7 surrounding the body portion 2 of the rotor R, and is provided with enlarged ends 8 surrounding the end flanges 3 of said rotor, step portions 8ª being provided at the juncture of the wall portions 7 and 8.

The substantially cylindrical wall portion 7 is provided with inwardly projecting bevel-ended abutments 19, 20 and 21 which contact with the periphery of the rotor body 2 and with the remainder of said wall portion 7, in forming cylinder spaces $C^1$, $C^2$ and $C^3$. Radially slidable pistons 14, 15, 16 and 17 are mounted in the pockets 4 and grooves 5 and are provided at their ends with peripheral projections 14ª in said grooves. These projecting portions 14ª carry rollers 14ᵇ located between the flanges 3 and the step portions 8ª. These rollers 14ᵇ engage the outer sides of continuous cams 14ᶜ carried rigidly by said step portions, said cams being shaped in accordance with the contour of the piston-engaging surface of the casing wall portion 7 and coacting with the rollers 14ᵇ in holding the pistons engaged with said surface. These pistons may, if desired, be provided with anti-friction rollers 14ᵈ for running contact with said surface. Anti-friction rollers 14ᵉ may also be provided for the pistons in the pockets 5, if desired.

The body portion 2 of the rotor R is formed with two sets of arcuate circumferentially extending grooves opening through its periphery and extending between the pistons. The grooves of one set are denoted at 9 and 11 and they are disposed in one plane at right angles to the rotor axis. The grooves of the other set are identified at 10 and 12 and these grooves are disposed in a plane parallel with the aforesaid plane. The groove 9 extends between the pistons 14 and 15, the groove 11 extends between the pistons 16 and 17, groove 10 extends between pistons 15 and 16 and groove 12 between pistons 17 and 14, the pistons of the one set 9, 11 being in staggered relation with the pistons of the second set 10, 12.

Each one of the abutments 19, 20, 21 carries a sliding gate 27 urged inwardly by a spring 32 and so positioned as to transversely close the grooves 9 and 11 whenever allowed to enter said grooves (see Fig. 10). Each one of said abutments 19, 20 and 21 also carries a second gate 28 urged inwardly by a spring 32ª and positioned to transversely close the grooves 10 and 12 whenever allowed to enter the same (see Fig. 11). Each one of the abutments 19, 20, 21, is formed with a compressed gas-receiving chamber denoted in general at G, said compressed gas-receiving chamber having an inlet end 23 at the approach side of the abutment or gate 27 to coact with the grooves 9 and 11 (see Figs. 4, 10 and 13) and being provided with a delivery end 24 at the far side of the gate 28 to coact with the grooves 10 and 12 (see Figs. 4, 11 and 13). Each of these compressed gas-receiving chambers G is provided with a pipe portion 24ª for a purpose to appear.

Each abutment 19, 20, 21 is formed with an explosive gas admission passage 22 whose receiving end communicates with a pipe or the like 22ª connected with an appropriate carbureter (not shown). The discharge end 22ᵇ of the passage 22 is disposed at the far side of the gate 27 (Figs. 4, 10 and 13) in position to communicate with the grooves 9 and 11. Each abutment 19, 20, 21 is provided also with an exhaust passage 25 disposed at the approach side of the gate 28 (Figs. 4, 11 and 13) in position to communicate with the grooves 10 and 12. By the expression "approach side" of the gate 27 or 28, I mean the side of the gate which is approached by the pistons 14, 15, 16 and 17 as the rotor R rotates, and "far side" refers to the opposite side at which the pistons leave the gates.

Each abutment 19, 20, 21 is formed with a passage 29 (Figs. 4, 6, 7, 8, 9 and 13) leading from the chamber G at a point near the admission end 23 of this chamber, to the atmosphere, said passage preferably opening into the exhaust passage 25 and communicating with the atmosphere through the instrumentality of said exhaust passage. At the juncture of the passage 29 with the chamber G, a rotatable valve 30 is provided. During normal operation of the engine, this valve stands as seen in Figs. 4, 6 and 8 and gas compressed by one piston or another is forced into the chamber G through the admission end 23 thereof, the opposite end 24 being at that time closed by the rotor. When it is desired to exert a braking action on the engine however, the gas being compressed is not permitted to freely enter the chamber G. On the contrary, the valve 30 is turned (see Figs. 7 and 9) so as to shunt the gases being compressed through a restricted passage into the passage 29 and on to the exhaust passage 25 and the atmosphere. In being forced through this restricted passage, the gases of course retard rotation of the rotor and exert a braking action thereon.

I have above described the fact that each compressed gas-receiving chamber G is provided with a pipe portion 24ª. From Figs. 4, 10, 11, 12 and 13, it will be seen that this pipe portion is within the fresh gas admission passage 22. After the gas is compressed into the chamber G, as groove 10 or 12 communicates with the discharge end 24 of said chamber G, the compressed gas is fired at said end 24 of said chamber G through the instrumentality of a suitable spark plug or the like 31, there being of course one of these ignition devices 31 for each chamber G. As the gases are fired, they are released from the chamber G behind the rotor pistons, by means of the groove 10 or 12. The incoming fresh gases in flowing through the passage 22 around the pipe portion 24ª, cool this pipe portion and at the same time the ingoing gases are warmed for greater efficiency. An effective heat exchanger is thus provided by locating the pipe portion 24ª of the chamber G in the fresh gas admission passage 22.

Suitable means forming no part of the present invention, may be provided for controlling the circuits of the spark plugs 31, portions of said means being shown at 28ª and 28ᵇ.

An appropriate water jacket 33 is provided for the casing, and 34 and 35 denote inlet and outlet passages for said jacket.

It is to be understood that the present disclosure is for illustrative purposes only and that numerous changes and refinements may be made; also that sectional construction may be employed wherever advisable to facilitate manufacture, assembly or repair.

Operation

When the rotor R stands in the position shown in the drawings (see more particularly Figs. 1, 10 and 11), the chamber G of the top abutment 19 is full of compressed explosive gases which have been compressed into it by piston 14, and as the ends 23, 24 of said chamber are then closed by the rotor, said compressed gases are momentarily trapped in said chamber. The cylinder space $C^1$ has just about finished filling with explosive mixture behind the piston 15, which mixture entered said cylinder space $C^1$ through the admission passage 22 of the abutment 19 and the groove 9 as seen at the upper right portion of Fig. 10. As this fresh mixture entered, it passed around the pipe portion 24ª of the chamber G in abutment 19 so that the ingoing gases were heated and said chamber simultaneously cooled. The portion of the cylinder space $C^1$ in advance of the piston 15 is being scavenged of burnt gases which are discharging through the groove 10 to the exhaust passage 25 of the abutment 20 as seen at the right of Fig. 11. In the portion of the cylinder space $C^2$ behind the piston 16, the gases have been fired upon entrance of the sliding gate 28 of abutment 20 into the groove 10, and said gases are expanding against the piston 16. In the portion of the cylinder space $C^2$ in advance of this piston 16, explosive gases previously admitted to said cylinder space $C^2$ through the admission passage 22 of the abutment 20 and the groove 11, are being compressed and conducted through said groove 11 into the chamber G of the abutment 21 as seen at the left of Fig. 10, the end 24 of said chamber G being closed by the rotor as seen at the left of Fig. 11. The portion of the cylinder space $C^3$ behind the piston 17 is receiving fresh explosive gases from the admission passage 22 of the abutment 21 as seen at the left of Fig. 10, said gases flowing into said cylinder space from said passage 22 through the groove 11. The portion of the cylinder space $C^3$ in advance of the piston 17 is being scavenged of exhaust gases which are being forced by said piston through the groove 12 and the exhaust passage 25 of the abutment 19 as seen at the upper left portion of Fig. 11.

When the rotor turns a short distance from the position of Fig. 1, the compressed gases previously trapped in the chamber G of abutment 19, are released into groove 12 behind piston 14 which has entered the cylinder space $C^1$. By this time, the ignition circuit of the spark plug 31 of abutment 19 has been closed, the charge being thus fired behind piston 14 and causing it to compress gas into chamber G of abutment 20, to be later released into cylinder C³ and fired.

As the piston 15 passes abutment 20, a fresh charge of explosive gas is admitted to the cylinder space C² behind said piston 15 through the groove 9 and the passage 22 of said abutment 20, to be compressed into the chamber G of abutment 21 by piston 14 when the latter passes said abutment 20.

Upon still further turning of the rotor, as piston 16 passes abutment 21, the compressed gas in the chamber G of said abutment 21, is momentarily trapped, and as soon as said piston 16 has passed said abutment 21 and entered cylinder space C³, the compressed charge is released from said chamber G into said cylinder C³ behind said piston 16, by means of the groove 10, the released gas being fired. Piston 17 has by this time completed scavenging and after it passes abutment 19, explosive mixture enters the cylinder space C¹ behind it through the passage 22 of said abutment 19 and the groove 11 behind said piston 17, which mixture will be acted upon by the following piston 16 in the same manner as described in connection with piston 14.

So many operations transpire concurrently that it would be extremely difficult to clearly describe all of them, but it will be seen from the foregoing that the gas is admitted, compressed, fired and exhausted at proper intervals, that a plurality of explosions will occur at each revolution of the rotor, and that a substantially continual turning force is, therefore, imparted to the shaft. Whenever a braking force is desired, this may be obtained by adjusting the valves 30 to cause the compressed gas to discharge through more or less restricted openings to the atmosphere, instead of allowing said gas to be compressed freely into the chambers G.

Any appropriate number of cylinder spaces and pistons may be used and the invention may be widely varied within the scope of the subjoined claims.

I claim:—

1. A rotary internal combustion engine comprising a cylindrical casing having a circumferential wall and circumferentially spaced fixed abutments projecting inwardly from said wall, a cylindrical rotor mounted within and concentric with said casing, said rotor being in peripheral contact with said abutments and coacting with said abutments and said casing in providing a plurality of cylinder spaces, radially slidable pistons carried by said rotor and means for holding said pistons in contact with said circumferential wall and said abutments, said rotor having two sets of peripheral circumferentially extending grooves between said pistons, the grooves of one set being in one plane transverse to the rotor axis, and the grooves of the second set being in a second and parallel plane, the grooves of said one set being equal in number to half the number of said pistons and being disposed in staggered relation with those of said second set and vice-versa; one spring-pressed gate mounted in each of said abutments and positioned to transversely close the grooves of said one set, a second spring-pressed gate mounted in each abutment in position to transversely close the grooves of said second set; a compressed gas-receiving chamber in each abutment having a receiving end at the approach side of said one gate to communicate with the grooves of said one set, said compressed gas-receiving chamber having a delivery end at the far side of said second gate to communicate with the grooves of said second set, a fresh gas admission passage in each abutment having its discharge end disposed at the far side of said one gate in position to communicate with the grooves of said one set, and an exhaust gas passage in each abutment having its inlet end disposed at the approach side of said second gate in position to communicate with the grooves of said second set.

2. A structure as specified in claim 1; said compressed gas-receiving chamber of each abutment being provided with a pipe portion passing through a portion of the fresh gas admission passage of said abutment, said portion of said fresh gas admission passage serving as a heater for the fresh gas.

3. A structure as specified in claim 1; together with a passage leading from the admission end of said compressed gas-receiving chamber of each abutment to the exterior of the engine, and valve means having one position in which it closes said passage without obstructing said chamber, and at least one other position in which it closes said chamber and opens said passage to a desired extent, to create a braking force.

4. In a rotary internal combustion engine, a casing having an internal fixed abutment between two cylinder spaces, said abutment being provided with a compressed gas-receiving chamber, a rotor in said casing having a piston which acts to compress gas as it approaches said abutment in one of said cylinder spaces and acts as a power piston when it passes said abutment into the other of said cylinder spaces, said rotor having one groove for directing the gas compressed by said piston from said one cylinder space into said chamber and a second groove laterally offset from said one groove for placing said chamber in communication at the rear of said piston with said other cylinder space when the piston has entered the latter, means for firing the gas when said chamber and other cylinder space are in communication, gates for transversely closing said grooves and preventing direct communication between said cylinder spaces, a fresh gas admission passage for said other cylinder space positioned to coact with said one groove, and an exhaust passage for said one cylinder space positioned to coact with said second groove.

5. An internal combustion engine having means for compressing the gas used in its operation, and means for restrictedly shunting the compressed gas to the exterior of the engine if desired, said means comprising a gas passage and a valve normally closing said passage, said valve being operable to open said passage to allow restricted escape of the compressed gas when it is desired to create a braking force.

6. In an engine, a compressed gas-receiving chamber, a piston for compressing gas into said chamber, a passage leading from the admission end of said chamber to the exterior of the casing, and valve means at the point of juncture of said chamber and passage, said valve means having one position in which it closes said passage without obstructing said chamber, and at least one other position in which it closes said chamber and allows restricted escape of the compressed gas through said passage to create a braking force.

HENRY DANIEL SMELSER.